(12) United States Patent
Yundt et al.

(10) Patent No.: US 8,154,228 B2
(45) Date of Patent: Apr. 10, 2012

(54) DYNAMIC BRAKING FOR ELECTRIC MOTORS

(75) Inventors: George B. Yundt, Andover, MA (US); David S. Colson, Wakefield, MA (US)

(73) Assignee: Kollmorgen Corporation, Radford, VA (US)

( * ) Notice: Subject to any disclaimer, the term of this patent is extended or adjusted under 35 U.S.C. 154(b) by 407 days.

(21) Appl. No.: 12/481,925

(22) Filed: Jun. 10, 2009

(65) Prior Publication Data
US 2010/0315025 A1    Dec. 16, 2010

(51) Int. Cl.
*H02P 3/00* (2006.01)
(52) U.S. Cl. .................................. 318/375; 318/432
(58) Field of Classification Search .......... 318/375–377, 318/400.02, 432
See application file for complete search history.

(56) References Cited

U.S. PATENT DOCUMENTS

| | | | |
|---|---|---|---|
| 4,423,363 A | 12/1983 | Clark et al. | |
| 4,680,695 A | 7/1987 | Kerkman et al. | |
| 5,442,276 A | 8/1995 | Schwartz et al. | |
| 6,014,007 A * | 1/2000 | Seibel et al. | 318/805 |
| 6,118,241 A | 9/2000 | Kazlauskas | |
| 6,215,261 B1 | 4/2001 | Becerra | |
| 6,388,419 B1 | 5/2002 | Chen et al. | |
| 6,417,644 B2 | 7/2002 | Hammond et al. | |
| 6,459,230 B1 | 10/2002 | Tao | |
| 6,580,247 B2 | 6/2003 | Nakazawa | |
| 6,737,828 B2 * | 5/2004 | Kiuchi et al. | 318/779 |
| 6,828,750 B2 | 12/2004 | Nakazawa | |
| 6,998,800 B2 | 2/2006 | Fulton | |
| 7,135,833 B2 * | 11/2006 | DeLange et al. | 318/762 |
| 2001/0019253 A1 | 9/2001 | Hammond et al. | |
| 2006/0271336 A1 | 11/2006 | Murphy | |

\* cited by examiner

*Primary Examiner* — Rina Duda
(74) *Attorney, Agent, or Firm* — Withrow & Terranova, PLLC

(57) ABSTRACT

A system and method are provided for improved dynamic braking in AC motors with an electronic drive, and more particularly to using a current regulation circuit to control the current supplied to the motor to be in phase with the internal EMF voltage of the motor such that the braking torque of the current is maximized per ampere of dynamic braking current when needed to stop the motor in case of a control failure or emergency. A current regulator produces a voltage command to the motor based on the current command input. The motor is still controlled by a d-q current regulator and the q-axis (torque axis) voltage is driven to zero while the d-axis (non-torque axis) is left in current control with a zero current command. This way the motor internal voltage drives a current in the terminals of the motor but the current is in phase with the internal voltage of the motor. Since the current loops are still active, current limiting may be implemented and the dynamic brake current amplitude can be well controlled and entirely goes into stopping the motor.

34 Claims, 4 Drawing Sheets

DYNAMIC BRAKING FOR ELECTRIC MOTORS

FIELD OF THE DISCLOSURE

The technology of the present application relates to a system and method for improved dynamic braking in electric motors.

BACKGROUND

In a typical permanent magnet AC motor, such as a brushless DC motor or a permanent magnet AC servo motor system, for example, the motor winding is on the stator and is in a three-phase configuration. Energization of the windings is controlled through a six-transistor bridge circuit, where the transistors are operated in a switching mode according to the motor position, or the position of the rotor in a rotary motor, and motor force commands, such as torque commands. Three of the transistors are connected to the positive supply bus and the remaining three transistors are connected to the negative supply bus. Sinusoidal or trapezoidal excitation of the winding may be achieved by pulse width modulation (PWM) control of the switching transistors. A back-biased diode, or flyback diode, is commonly connected across each of the emitter-collector circuits of the switching transistors to bypass transients from the switching control of the inductive motor load. The motor windings can also be energized in a controller manner by other amplifier topologies such as a linear transistor amplifier topology.

In motor drive systems of the type discussed above, when the control system fails, it is often necessary to actively bring the motor to zero speed assuming the minimum possible amount of hardware/control is working. In order to do so, many motor control systems include dynamic braking capability. In a dynamic braking mode, the motor usually operates as a generator and either dissipates energy into the motor windings, or dissipates energy into a resistive load. Such dynamic braking may be achieved in both brush-type motors as well as brushless motors, or AC servo motors.

One simple way to brake a motor is to use a relay to disconnect the motor form the power source (electronic drive or AC line) and then put a three phase short across the motor windings. In this manner, the kinetic energy of the motor is dissipated in the motor coil resistances.

Another prior art technique is disclosed in U.S. Pat. No. 6,118,241 to Kazlaukas entitled "Dynamic Braking System for Electrical Motors." Therein, the electronic drive power transistors short the motor terminals line to line. Dynamic braking is achieved by simultaneously rendering conductive the three transistors connected to a positive bus, or the three transistors connected to a negative bus. This technique is referred to as a "three phase short" technique. When three such transistors are simultaneously rendered conductive, current flows from one or more motor windings to one of the supply busses through one or two of the conductive transistors and returns to other motor winding or windings through one or more of a plurality of back-biased diodes. This arrangement provides dynamic braking regardless of rotor position. The braking operation may be achieved using the three transistors connected to the positive bus or by using the three transistors connected to the negative bus. If sufficient control is provided, the dynamic breaking system may alternate between transistors connected to the positive bus and those connected to the negative bus, thus sharing the load between all transistors. When the three transistors connected to a bus are simultaneously rendered conductive, they essentially short circuit the winding and dynamic braking is provided. When all 6 transistors are simultaneously rendered non-conductive motor current flows through one or more of the plurality of normally back biased diodes and the magnitude of the dynamic braking current is reduced. Pulse width modulation (PWM) control of the conductive intervals may be used to control the degree of braking through controlling the magnitude of the braking current. This transistor shorting modulation technique adds the benefit of allowing the peak current flowing in the motor as a result of the three phase short to be limited in a controlled manner. Limiting the maximum current limits possible damage to the power transistors and also prevents excessive current in the motor which might demagnitize it.

However, one major disadvantage of these aforementioned techniques is that the current that flows when the short occurs does not all go towards stopping the motor. In a three phase permanent magnet motor, at higher speeds, the short circuit current is almost entirely set by the back electromotive force ("back EMF") applied over the motor winding inductance. The back EMF is the voltage that occurs in electric motors where there is relative motion between the windings of the motor and the external magnetic field from permanent magnets or electro magnets. The back EMF is in quadrature (ninety degrees out of phase) to the current that flows in the motor winding inductance. Since the short circuit current is almost entirely set by the back EMF divided by winding inductive impedance at higher speeds, the short circuit current is almost entirely in quadrature to the back EMF, meaning almost all the current does not create stopping torque.

Stopping the motor as fast as possible in case of a control fault is advantageous, particularly at high speeds. If the motor does not stop fast enough there may be damage to the machine incorporating the motor or even human injury. If the current control circuitry or current limiting circuitry of the motor drive does not act to stop the motor fast enough, the motor drive may fault due to an over current condition causing the braking to stop. Additionally, if the motor is operating at high speeds and the motor is shorted according to the prior art techniques, the resulting current may be high enough that damage may be caused to the windings of the motor or the permanent magnet, or even to the motor drive.

Thus, there remains a need for a system for efficiently stopping a motor in a dynamic braking mode that avoids the problems of the previous systems, including those described above, and uses the minimum amount of control circuitry to insure high reliability. In particular, it would be useful to maximize the stopping torque per ampere of the dynamic braking current to more efficiently brake the motor.

SUMMARY OF THE DETAILED DESCRIPTION

The embodiments disclosed herein provide a dynamic braking system and method that employ a current regulator to produce a voltage command based on the current command input. In particular, the motor is still controlled by a d-q current regulator, where the q-axis (torque axis) voltage is driven to zero, or approximately zero, while the d-axis (non-torque axis) is left in current control with zero current command. In this manner, the motor internal EMF voltage drives a current in the terminals, but the current is in phase with the internal EMF voltage of the motor. Thus, the stopping torque per ampere of dynamic braking current is maximized and the motor is braked quickly. Since the current loops are still active, current limiting may be implemented and the dynamic brake current amplitude is well controlled and all goes into stopping the motor.

In one embodiment, the q-axis torque voltage may be directly forced to zero volts, or in the alternative, a voltage control loop through the normal q-axis current loop current command input can drive the q-axis voltage to 0. The latter embodiment may include a dynamic braking current limit clamp on the q-axis current command to control the dynamic braking current amplitude.

In another embodiment of the invention, improved motion damping may be added to the dynamic braking loop in order to avoid "ringing" of the motor motion as it stops. One way to accomplish this is by virtually adding resistance to the system by controlling a linear combination of q-axis voltage and current to be zero instead of just the q-axis voltage.

In yet another embodiment of the invention, the dynamic braking may be provided in only one direction. One way to accomplish this unidirectional dynamic braking is clamp the q-axis voltage command to be either only positive or only negative in such a way as to control in what direction the dynamic braking is provided. In other words, in this alternate embodiment, the motor control system has normal functionality in one motion direction and dynamic braking in the other.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
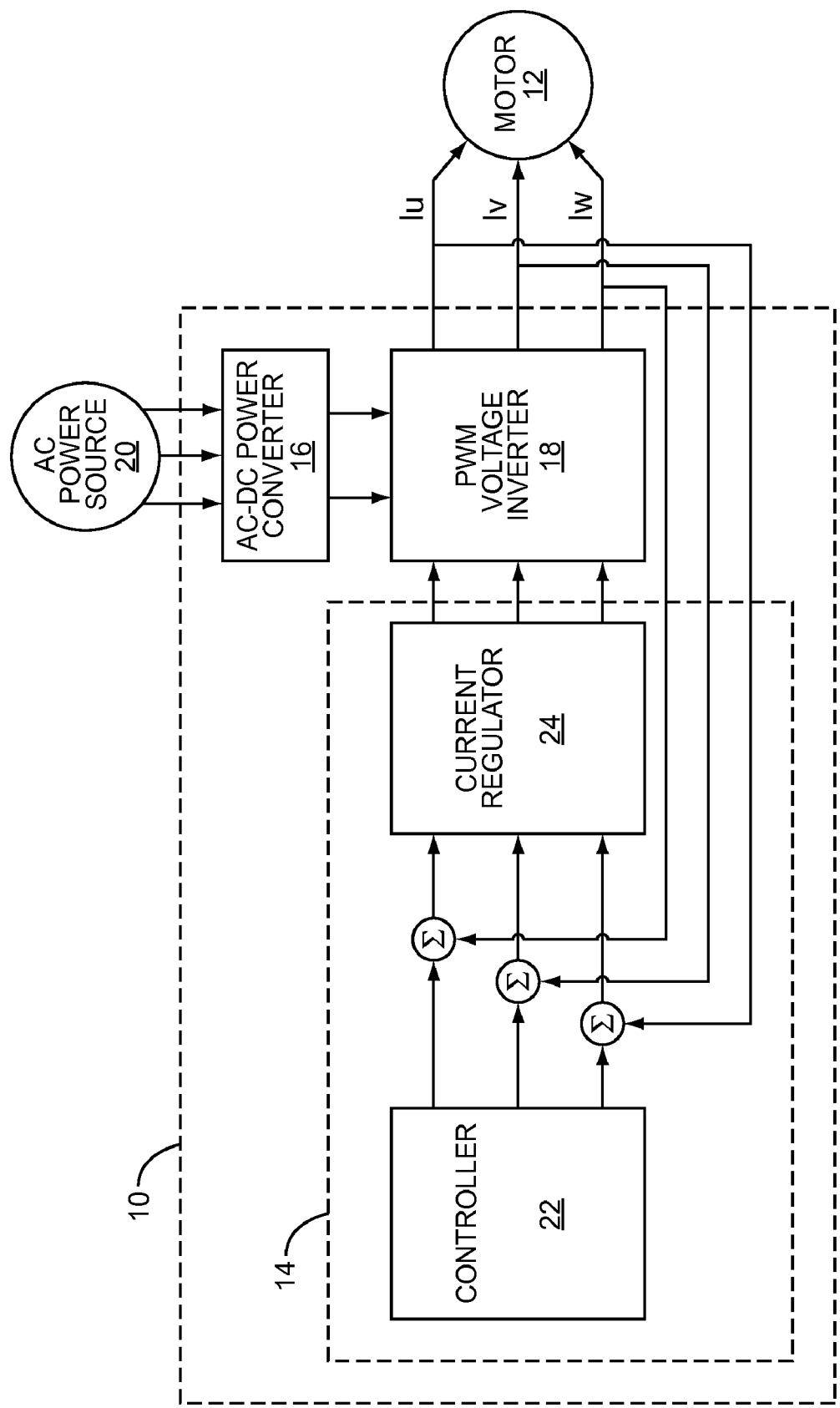
FIG. 1 illustrates a motor drive which includes a 3 phase current regulator for a motor.

FIG. 1 illustrates a block diagram of a motor drive 10 which drives a motor 12, which may be a permanent magnet motor and may or may not be 3 phases as shown. The motor drive 10 includes a control system 14, an AC to DC (AC-DC) power converter 16, and a PWM (Pulse Width Modulation) voltage inverter 18. The voltage inverter 18 may also include a typical six-transistor bridge circuit. The control system 14, the AC-DC power converter 16, and the PWM voltage inverter 18 cooperate so as to drive the motor 12 using power supplied by an AC power source 20. In particular, the motor drive 10 supplies three phase voltage commands to the PWM voltage inverter 18, which in turn supplies current to the motor 12. The PWM voltage inverter 18 receives power from the AC power source 20 through the AC-DC power converter 16.

The control system 14 may include a controller 22. The controller 22 may be a CPU or other microprocessor operating according to instructions stored in code, such as software or firmware or may be dedicated or discrete control logic. The control system 14 also includes a current regulation circuit 24, which preferably is a d-q current regulator, but may be any other type of current regulator. For example, a three phase current regulator that operates to control each of the individual currents Iu, Iv, and Iw through the motor may be used and is shown in FIG. 1. In a three phase current regulator, there is a one-to-one correspondence between the current regulators and the phases of the motor 12. The three phase current regulator would regulate the current through the motor 12 by generating voltage commands Vu*, Vv* and Vw* based on current commands Iu*, Iv* and Iw*. (Herein, lower case letters u, v and w denote phase U, phase V, and phase W, respectively, and a superscripted asterisk denotes a "command signal".)

Figure 2:
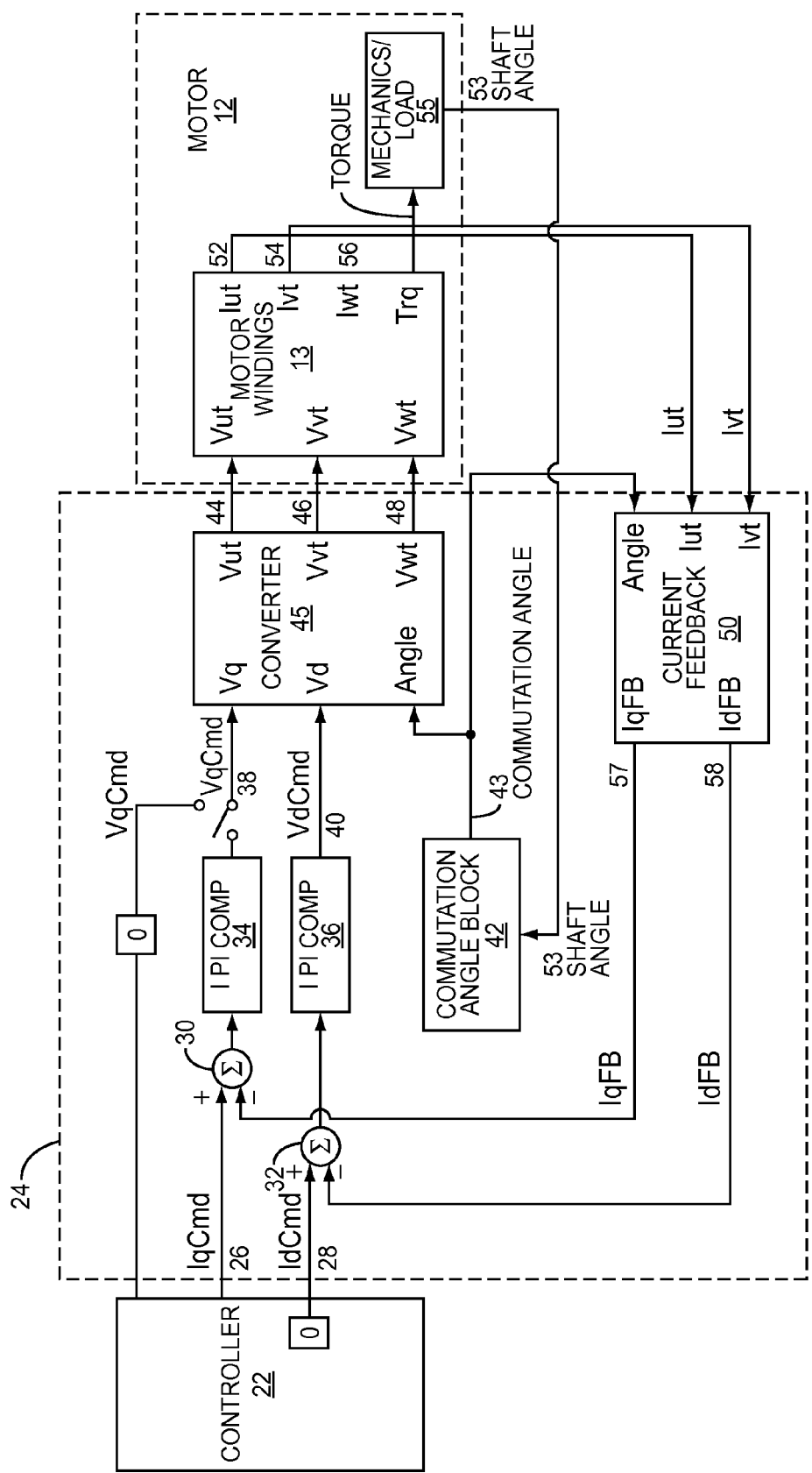
FIG. 2 illustrates a system for dynamic braking of a motor having an internal voltage, wherein the system includes a current regulator and a controller to control the current provided to the motor such that the current is in phase with the internal voltage of the motor in order to achieve dynamic braking of the motor.

A d-q current regulator 24 as used in this preferred embodiment is shown in FIG. 2. The two phase (d-q) current regulator 24 operates to control the currents Id and Iq through the motor (conventionally in the stationary field or rotating reference frame). The q-axis is also referred to as the torque axis and the d-axis as the non-torque axis. The q-axis is in phase with the back ENF voltage of the motor, while the d-axis is in quadrature with the back EMF voltage of the motor. The current regulator produces a pair of voltage commands, VqCmd and VdCmd, based on a pair of current command inputs, IqCmd and IdCmd and the corresponding measured actual currents IqFB and IdFB.

The current regulator 24 of the invention may be implemented in firmware executed by a processor, or preferably is implemented in discrete hardware, such as a field programmable gate array (FPGA). However, there are a couple of practical considerations with this improved dynamic braking technique of the invention compared to prior art techniques. Notably, dynamic braking is a backup mode that is usually only initiated when there is a failure or fault of some kind, necessitating the stopping of the motor. Often, this failure or fault is caused by a control software problem or failure. If the control software is working, then the motor may be stopped normally by servo control loops controlled by the software without implementing dynamic braking. If the control software does not work or can not be trusted to do the right thing, it may be difficult to implement dynamic braking other than by the prior art three phase short technique. In drives where the current regulator is in firmware running on a processor the assumption that the current regulator is always available when a dynamic braking emergency stop is needed may not be valid.

However, if the current regulator 24 is in discrete hardware, such as an FPGA, for example, the availability of the current regulator 24 should be the same as any technique that uses the drive power transistors to perform dynamic braking. By implementing the current regulator 24 of the invention in discrete hardware, such as an FPGA, it is much more likely that the current regulator 24 will operate, because the position feedback input will work and the commutation angle derived from position feedback will be obtainable, thereby ensuring the proper operation of the current regulator 24 according to the invention. However, in the event that the commutation feedback angle is not available, the dynamic braking may reduce to the less effective prior art technique of a three phase short with peak current limiting.

There is also the possibility of implementing a simple sensorless commutation technique when the feedback information, including the commutation angle, is not available in the case of a failure. The sensorless commutation technique will be good enough to bring the shaft down to low speed and then switch to the three phase short technique. In sensorless commutation techniques, the back EMF voltage of the motor may be known or determined and thus the commutation angle may be inferred from the back EMF in the case of a position feedback device failure. Such sensorless commutation techniques are well known in the art.

Returning to FIG. 2, in normal operation, the controller 22 generates the current commands IqCmd 26 and IdCmd 28. During normal (non-dynamic braking) operation, the controller 22 generates the commands IqCmd 26 and IdCmd 28 based on a command received at a user input, such as a speed command (not illustrated). The current regulator 24 includes a PI (proportional-integral) feedback control loop. The PI feedback control loop includes summers 30 and 32, as well as PI compensators 34 and 36, one for each of the current input commands. The PI feedback control loop controls the flow of actual motor currents based on the current commands IqCmd 26 and IdCmd 28.

The outputs of the current regulator are the voltage commands VqCmd 38 and VdCmd 40. VqCmd 38 and VdCmd 40 are used, in conjunction with a commutation angle 43 to generate the three-phase voltages Vut 44, Vvt 46, and Vwt 48. The three phase voltages may be generated by converter 45, which may be a standard two d-q to U, V, W three phase converter. The converter 45 may include a PWM voltage inverter, such as the PWM voltage inverter 18 shown in FIG. 1. The motor terminal voltages Vut 44, Vvt 46 and Vwt 48 are created by the PWM voltage inverter 18. The PWM voltage inverter 18 drives the motor 12 using power supplied by the AC power source 20 via the AC-DC power converter 16. In this manner, voltages Vut 44, Vvt 46, and Vwt 48 are supplied to the terminals of the motor. Holding the motor terminal currents at a fixed relationship to the back EMF of the motor is called electronic commutation and requires a position measurement of the motor's electrical angle.

The control system 14 also includes a current feedback 50 which receives the measured winding currents Iut 52 and Ivt 54 from the motor, and performs calculations using the current Iut 52 and Ivt 54, and the commutation angle 42, to determine the current feedbacks IqFB 57 and IdFB 58, which are then fed back into inputs of the current regulator 24. In one embodiment, IqFB can be calculated using the equation IqFB=Iu*sin(A)+Iv*sin(A−120°)+Iw*sin(A−240°), where A=(P/2)*(shaft angle)+$A_0$ and P=number of motor poles and $A_0$=constant phase shift angle to match feedback sensor, motor angle coordinate systems. IdFB can be calculated similarly but with "sin" replaced with "cos". In particular, IqFB 57 is algebraically summed with IqCmd 26, while IdFb 58 is algebraically summed with IdCmd 28. The measured motor windings currents, provided by current sensors not shown, are input to current feedback block 50 which calculates the current feedback signals IqFB 57 and IdFB 58 for the current regulator 24. The current feedback block 50 also uses the motor electrical angle that is provided by commutation angle block 42. Commutation angle block 42 takes motor position input from a position feedback sensor (not shown) tied to the motor. The motor torque goes into mechanics/load block 55 that represents the mechanics of the motor, which outputs a shaft angle 53 as an input to block 42. Commutation angle block 42 uses the shaft angle 53 to calculate the commutation angle 43. The commutation angle 43 is then sent as an input to converter block 45 and current feedback block 50. In the normal operation (no dynamic braking) the current feedback information is compared with the input commands IqCmd 26 and IdCmd 28 of the current regulator 24 to provide motor control. If the system is operated as a torque servo, a torque command is compared to the torque of the motor and the motor energization is adjusted accordingly to maintain the desired torque. If the system is operated as a velocity servo, a velocity command is compared to the velocity feedback and the motor energization is adjusted accordingly to maintain the desired speed. If the system is operated as a position servo, the motor energization is adjusted according to distance from the target position by comparing a position command to the actual position.

In the example shown in FIG. 2, the IqFB 57 is summed with IqCmd 26 before being supplied to the PI compensator 34 of the current regulator 24, and IdFB 58 is summed with IdCmd 28 before being supplied to the PI compensator 36 of the current regulator 24. In normal operation for permanent magnet motors, the IdCmd 28 will typically be zero such that there is a zero current command in the non-torque axis. IqFB 57 is summed with the normal IqCmd 26 to provide the current command for the torque axis in order to generate the torque in the motor 12. Thus, in normal operation (not dynamic braking), the IqCmd 26 will generate a VqCmd 38 such that, given the IdCmd 28 of zero in the non-torque axis, every ampere of current will flow in the q-axis and will maximize torque in the motor 12 per ampere of winding current. The IdCmd 28 can be varied by controller 22 to change the motor operating conditions and create no torque.

The current regulator 24 provides a loop in which current commands in the d-q reference frame, IqCmd 26 and IdCmd 28 are algebraically summed with feedback signals IqFB 57 and IdFB 58. This produces two sums (or differences) that are processed through the respective PI compensators 34 and 36 to produce the VqCmd 38 and VdCmd 40 signals. The Vqmd and VdCmd signals 38 and 40 are processed together with the commutation angle 42 to produce the phase voltage outputs Vut 44, Vvt 46, and Vwt 48 to the PWM voltage inverter 18 to supply the current to the motor 12. One way to produce these three phase voltages from the two voltage command signals is by using a d-q to U, V, W 3-phase converter, such as converter 45, as is shown.

According to one embodiment, as shown in FIG. 2, a system is illustrated for dynamic braking of a motor 12 having an internal back EMF voltage, wherein the system includes a current regulator 24 and a controller 22 to control the current provided to the motor 12 such that the current is in phase with the internal voltage of the motor 12 in order to achieve dynamic braking of the motor 12. In general, the system includes the current regulator 24 of FIG. 2. In one embodiment, when it is desired or necessary to stop or brake the motor, a dynamic braking mode is initiated. According to the invention, in dynamic braking mode, the VqCmd 38 of the current regulator 24 is forced to zero, or approximately zero, volts. This may be accomplished by commanding a zero from the controller 22 to the VqCmd 38. A zero VqCmd 38 may also be achieved by varying the current input IqCmd 26. By forcing the VqCmd 38 to zero, the q-axis voltage is driven to zero while the d-axis is left in normal current control with a zero current command. Since the IdCmd 28 is left as a zero command, no current will be generated in the non-torque axis, and thus, no current which is in quadrature to the back EMF voltage of the motor 12 is generated. By driving the q-axis voltage to zero, the only current is the current generated by the motor back EMF voltage and it is fed back to the current regulator via the current feedback 50. Thus, the only current will be the current that is driven by the motor, which is in phase with the back EMF voltage of the motor 12. As a result, the internal voltage of the motor drives a current in the terminals but the current is in phase with the internal voltage. This provides maximum stopping torque per ampere of dynamic braking current since very little (ideally none) of the current is in quadrature to the motor's back EMF.

Figure 3:
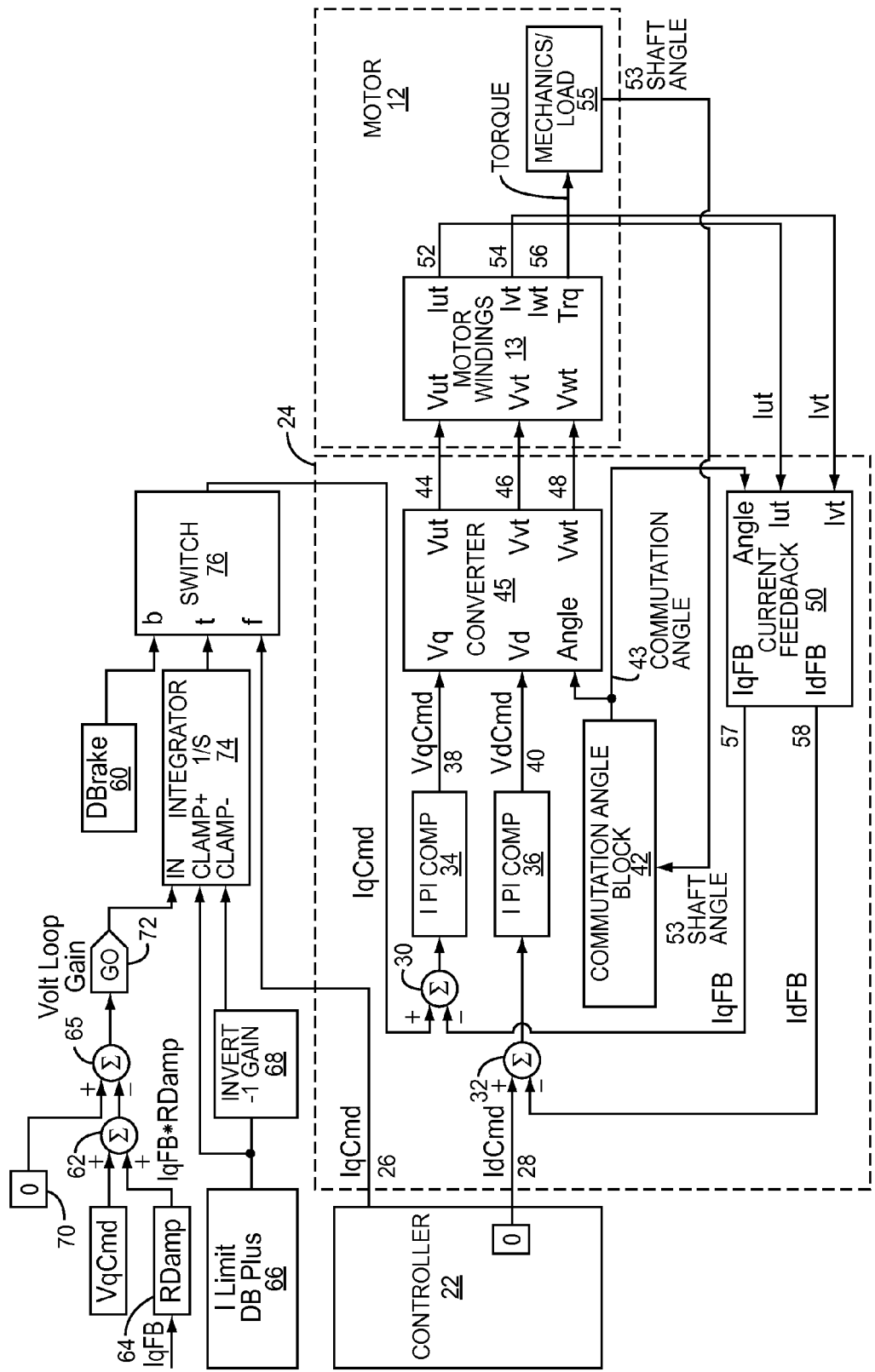
FIG. 3 illustrates a system for dynamic braking of a motor which includes a dynamic braking loop, wherein the current may be limited through the voltage loop driving the voltage command in the torque axis to zero, and damping resistance may be added electronically for improved damping of motion.

FIG. 3 shows another embodiment of the invention in which improved dynamic braking is provided with current limiting through a voltage loop driving the voltage command in the q-axis to zero, as well as allowing for improved motion damping. This embodiment, as seen in FIG. 3, is similar to that shown in FIG. 2, with the dynamic braking loop used to drive the voltage in the torque axis to zero being more specifically shown. In addition, the dynamic braking loop added in FIG. 3 also includes a means to limit the dynamic braking current, and a mechanism to provide increased damping to address any possible ringing of the motor motion as it comes to a stop, as discussed further below.

As shown in FIG. 3, the dynamic braking current is limited by the clamped value of the integrated output of integrator 74. Invert block 68 algebraically inverts dynamic braking maximum current input 66 to supply integrator 74 clamp inputs with symmetric positive and negative values of the desired predetermined maximum dynamic braking current. This controls the amplitude of the current and makes sure the current is in phase with the back EMF of the motor. By limiting current command IqCmd 26, this embodiment ensures that the current generated to achieve the dynamic braking does not get so high as to damage the coils or magnets of the motor, damage the motor drive. The IqCmd limt also controls deceleration to prevent damage to any machine mechanism connected to the motor.

FIG. 3 also includes a way to accomplish improved damping. When a motor operating at high speeds is stopped relatively quickly, as the motor slows down, it can go past zero speed and "ring" negatively and positively around zero speed. Ringing would occur around zero until natural damping occurs. According to the embodiment of the invention shown in FIG. 3, resistance may be virtually added to the system in order to provide more damping. By controlling the voltage to be zero, or by controlling the voltage and current commands in a linear combination (since V=I/R), a virtual resistance may be added. A linear combination of voltage and current may be implemented by feeding back a linear combination of voltage and current as represented by the output IqFB*RDamp of block 64 through the voltage loop gain 72 and integrator 74, the integrator 74 having adjustable clamps CLAMP+ and CLAMP−, as seen in FIG. 3.

In FIG. 3, if dynamic braking is initiated, a dynamic brake signal DBrake 60 is sent to a merge block 76. The merge block 76 may be any device capable of selecting between inputs, such as a switching device. The merge block 76 selects between the normal IqCmd 26 and the output of the dynamic braking loop from integrator 74. If DBrake 60 is false, the normal IqCmd 26 is selected and used in the current regulator 24 to generate the VqCmd 38. If DBrake 60 is true, the b input of the merge block 76 acts in a Boolean fashion to select the output of the dynamic braking loop. When DBrake 60 is false, it is good practice to hold integrator 74 reset to zero.

In the dynamic braking loop, a zero voltage VqCmd 70 is commanded and summed at summer 65 with the output of summer 62, which has algebraically summed the actual command VqCmd 38 and IqFB 57 through the virtual damping resistance RDamp 64. The output of summer 65 is passed through a voltage loop gain 72 and input into an integrator 74, along with the output of the invert block 68 and the positive dynamic braking maximum current input 66. These three inputs of integrator 74 as labeled IN, CLAMP+, and CLAMP− in FIG. 3. The clamps of integrator 74 are adjustable. Positive and negative current limits do not have to be the same magnitude. In other words, the positive rotation dynamic braking current limit may be set differently than the negative current limit. If dynamic braking has been initiated, the output of the integrator 74 is used as the IqCmd to the current regulator 24 in order to generate the VqCmd 38. In normal (not clamped) operation of the dynamic braking loop, the VqCmd 38 will be forced to zero causing braking current to flow in a moving motor in the torque producing axis, that is in phase with the motor's back EMF voltage. The IdCmd 28 is not affected, such that the d-axis is left in normal current control with a zero current command. Since the IdCmd 28 is left as a zero command, no current will be generated in the non-torque axis, and thus, no current which is in quadrature to the back EMF voltage of the motor 12 is generated. Thus, the only current will be the current that is driven by the motor, which is in phase with the back EMF voltage of the motor 12. As a result, the internal voltage of the motor drives a current in the terminals but the current is in phase with the internal voltage. This method provides maximum stopping torque per ampere of dynamic braking current since very little or none of the current is in quadrature to the back EMF.

Figure 4:
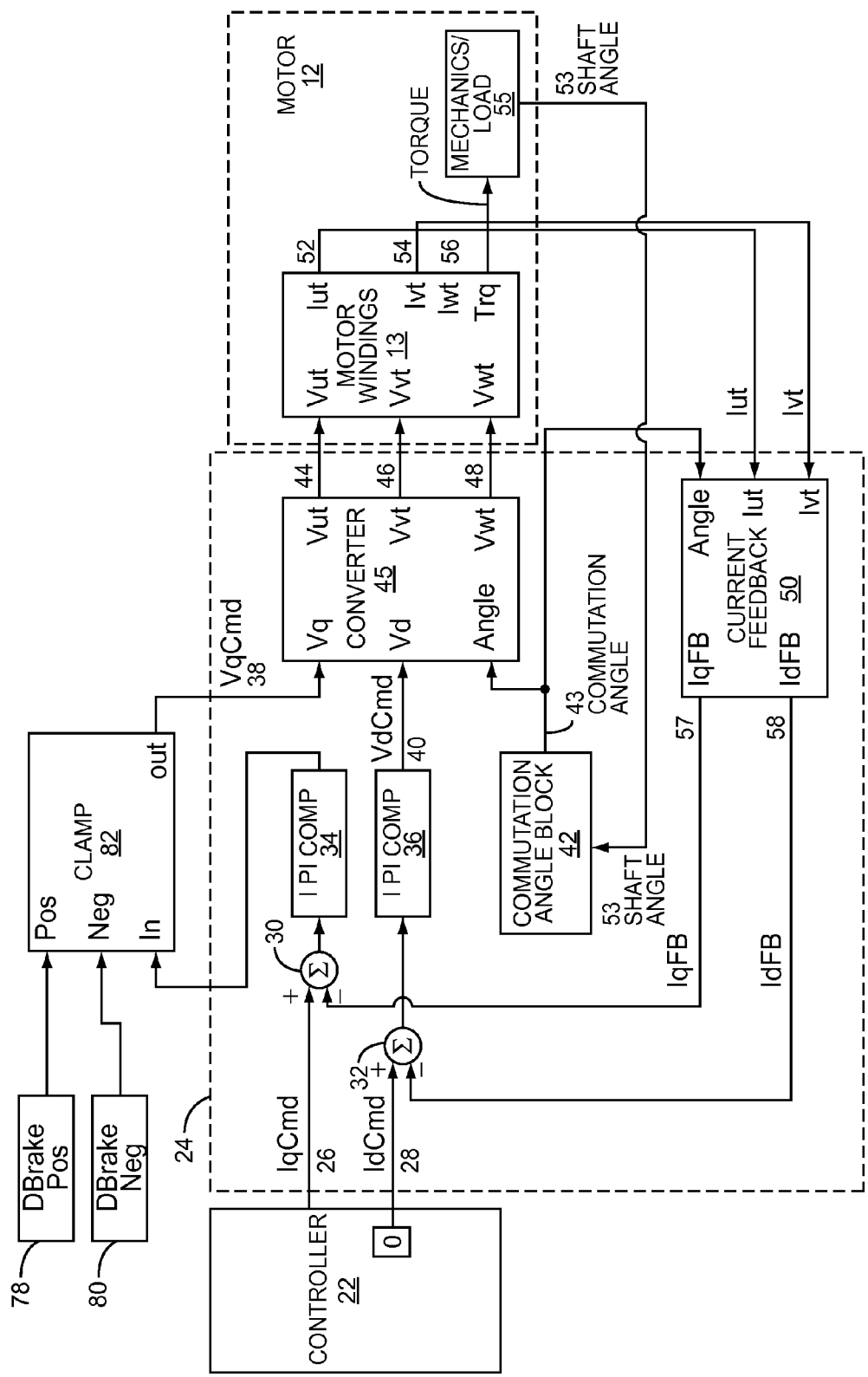
FIG. 4 illustrates a system like FIG. 2 for dynamic braking of a motor, in which the dynamic braking may be implemented in only one direction or in both a forward direction and a reverse direction, according to another embodiment.

FIG. 4 shows another embodiment in which dynamic braking may be implemented in both directions, or only in one direction. In the prior art dynamic braking methods, including the three short phase technique, once dynamic braking is implemented, there is no control over the motor drive. Depending on the type of motor and the use of the motor, it may be desirable to maintain some control over the motor. For example, with a linear motor or a rotary motor doing linear motion, it may be useful to have normal operation in one direction while doing dynamic braking in the other direction. As one example, there may be a motor controlling an arm, a screw, or a belt, and the motor will operate in the forward direction to push the arm, screw, or belt in one direction (e.g., forward) and operate in the reverse direction to cause the arm, screw, or belt to move in the opposite direction (e.g., backwards). In the case of a failure, it may be useful to dynamically brake the motor while still retaining the capability to retract the arm or screw, or move the belt. In the prior art, such a capability was not available in the case of a failure. Often, the failure would be due to a software fault, and the software was needed to move the arm, screw, or belt. In this example, it would be advantageous to stop the motor in the forward direction, but allow for normal operation in the reverse direction so that the arm, screw, or belt could be pulled back or otherwise moved. This capability is hereby referred to as directional dynamic braking.

In directional dynamic braking according to one embodiment, there are four modes. In the first mode, the motor is in normal operation in both the forward and reverse directions. In the second mode, there is dynamic braking in the forward direction and normal operation in the reverse direction. In the third mode, dynamic braking is implemented in the reverse direction and normal operation continues in the forward direction. In the final mode, dynamic braking is implemented in both directions.

In the embodiment shown in FIG. 4, directional dynamic braking is accomplished by clamping the VqCmd 38 via a clamp 82. Two inputs representing the need or desire to do directional dynamic braking are inputs to the clamp 82 and are referred to as directional dynamic braking inputs. The two directional dynamic braking inputs are referred to as DBrakePos 78 and DBrakeNeg 80. If DBrakePos 78 and DBrakeNeg 80 are both set to off, then clamp 82 out is equal to the clamp 82 In terminal and no dynamic braking in either direction is effected. In this situation, the current regulator 24 acts in typical fashion and there is normal operation of the motor in both directions. If only DBrakePos 78 is set to on, then VqCmd 38 is clamped to only negative voltages (i.e, must be equal to or less than zero) and dynamic braking is implemented in a positive direction and normal operation continues in the opposite direction. If only DBrakeNeg 80 is set to on, then VqCmd 38 is clamped to only positive voltages (i.e, must be equal to or greater than zero) and dynamic braking is implemented in the reverse direction and normal operation continues in the positive direction. If DBrakePos 78 and DBrakeNeg 80 are both set to on, then VqCmd 38 is clamped to only zero and dynamic braking is implemented in both directions, as shown in FIGS. 2 and 3.

In dynamic braking, it is often desirable to control the degree of braking and the magnitude of the current flow. Using the current regulator of the invention as discussed above, the current flow in each of the torque and non-torque axes is detected. These detected current values, along with the commutation angle, are supplied to the controller. The input current commands of the current regulator are controlled to thereby control the magnitude and phase with respect to the back EMF of the current flow during braking. The current flow is controlled to be in phase with the back EMF of the motor in order to achieve faster dynamic braking. In three phase short techniques, there is no control of the phase of the current due to the short applied across all three terminals, which removes the current regulator loop. As a result of winding inductance, nearly all of the current will be in quadrature to the back EMF of the motor at higher motor speeds, which does not provide much stopping force.

By practicing dynamic braking according to the invention, the stopping torque per ampere of braking current is maximized, thereby providing improved dynamic braking. The time and distance required to brake the motor is significantly less. Dynamic braking as accomplished by the invention has been demonstrated to be as much as ten times faster than the methods where the current is not in phase with the back EMF of the motor.

The invention provides substantial opportunity for variation without departing from the spirit or scope of the invention. There are numerous variations within the scope of this invention. For example, other current regulator configurations could be used in combination with different types of motors with a different number of phases. Also, digital logic could be used in place of a controller having a processor. In addition, the current limiting features of FIG. 3 can be combined with the directional dynamic braking features of FIG. 4. Those skilled in the art will recognize improvements and modifications to the preferred embodiments of the present invention. All such improvements and modifications are considered within the scope of the concepts disclosed herein and the claims that follow.

What is claimed is:

1. A system for dynamic braking a motor, comprising:
a current regulator having a plurality of input current commands to control a first voltage applied to the motor to provide a torque axis voltage and a second voltage applied to the motor to provide a non-torque axis voltage;
a dynamic braking loop associated with the current regulator, wherein the dynamic braking loop is configured to command a current to the current regulator;
a controller configured to cause the torque axis voltage to be zero, or approximately zero, such that the current provided to the motor is in phase with an internal voltage of the motor in order to achieve dynamic braking of the motor, wherein the controller is further configured to control at least one of the plurality of input current commands to drive the torque axis voltage to zero, or approximately zero; and
a current limiter for limiting a current that the dynamic braking loop commands to the current regulator.

2. The system of claim 1 wherein the motor is a permanent magnet motor having a winding with a plurality of phases and at least one permanent magnet is movable relative to the winding, wherein when the permanent magnet moves, the permanent magnet motor has an internal voltage that causes a dynamic braking current to flow.

3. The system of claim 1 wherein the current regulator is at least partially implemented in code executed by a processor.

4. The system of claim 1 wherein the current regulator is at least partially implemented in discrete hardware.

5. The system of claim 4 wherein the discrete hardware comprises a field programmable gate array (FPGA).

6. The system of claim 1 wherein the current regulator further comprises a feedback device configured to provide feedback to the current regulator.

7. The system of claim 2 wherein the current regulator further comprises a feedback device configured to provide feedback relating to the position of the winding relative to the at least one permanent magnet.

8. The system of claim 7 wherein the feedback comprises a commutation angle.

9. The system of claim 8 wherein the feedback device is configured to receive current output from the motor and determine current feedback signals based on the current output and the commutation angle.

10. The system of claim 9 wherein the feedback device is further configured to provide the current feedback signals to the current regulator.

11. The system of claim 1 further comprising a switch for selecting between the dynamic braking loop and a normal input current command.

12. The system of claim 1 wherein the motor includes a permanent magnet and is a brushless motor.

13. The system of claim 1,
wherein the motor is a permanent magnet motor having a winding with a plurality of phases and at least one permanent magnet is movable relative to the winding, and wherein the permanent magnet motor has an internal voltage when a current is applied to the winding;
wherein the current regulator further comprises a feedback device configured to provide feedback comprising a commutation angle relating to the position of the winding relative to the at least one permanent magnet;
wherein the feedback device is configured to receive current output from the motor, determine current feedback signals based on the current output and the commutation angle, and provide the current feedback signals to the current regulator; and wherein the system further comprises a means for implementing a three phase short to dynamically brake the motor when the commutation angle from the feedback device is not available.

14. The system of claim 1, wherein the motor is a permanent magnet motor having a winding with a plurality of phases and at least one permanent magnet is movable relative to the winding, and wherein the permanent magnet motor has an internal voltage when a current is applied to the winding;

wherein the current regulator further comprises a feedback device configured to provide feedback comprising a commutation angle relating to the position of the winding relative to the at least one permanent magnet;

wherein the feedback device is configured to receive current output from the motor, determine current feedback signals based on the current output and the commutation angle, and provide the current feedback signals to the current regulator; and wherein the system further comprises a means for implementing a three phase short to dynamically brake the motor when a speed of the motor approaches zero.

15. A system for dynamic braking a motor, comprising:

a current regulator having a plurality of input current commands to control a first voltage, applied to the motor to provide a torque axis voltage and a second voltage applied to the motor to provide a non-torque axis voltage; and a controller configured to cause the torque axis voltage to be zero, or approximately zero, such that the current provided to the motor is in phase with an internal voltage of the motor in order to achieve dynamic braking of the motor, wherein the current regulator further comprises a feedback device configured to provide feedback comprising a commutation angle;

wherein the feedback device is configured to receive current output from the motor, determine current feedback signals based on the current output and the commutation angle, and provide the current feedback signals to the current regulator; and wherein the system further comprises a means for implementing a three phase short to dynamically brake the motor when the commutation angle from the feedback device is not available.

16. The system of claim 15 further comprising a sensorless commutation means, wherein the sensorless commutation means is configured to determine the commutation angle, and wherein the sensorless commutation means is further configured to use the commutation angle to bring the motor from a high speed to a low speed before implementing the three phase short to dynamically brake the motor.

17. A system for dynamic braking a motor, comprising:

a current regulator having a plurality of input current commands to control a first voltage applied to the motor to provide a torque axis voltage and a second voltage applied to the motor to provide a non-torque axis voltage; and a controller configured to cause the torque axis voltage to be zero, approximately zero, such that the current provided to the motor is in phase with an internal voltage of the motor in order to achieve dynamic braking of the motor, wherein the controller is further configured to control at least one of the plurality of input current commands to drive the torque axis voltage to zero, or approximately zero;

a dynamic braking loop associated with the current regulator, wherein the dynamic braking loop comprises a voltage loop for driving the torque axis voltage to zero; and an electronically added resistance, wherein the electronically added resistance increases damping to eliminate any ringing when the motor is dynamically braked.

18. A system for dynamic braking a motor, comprising:

a current regulator having a plurality of input current commands to control a first voltage applied to the motor to provide a torque axis voltage and a second voltage applied to the motor to provide a non-torque axis voltage; and a controller configured to cause the torque axis voltage to be zero or approximately zero, such that the current provided to the motor is in phase with an internal voltage of the motor in order to achieve dynamic braking of the motor, wherein the controller is further configured to control the first voltage to be only positive or only negative such that dynamic braking of the motor is effected in only a single direction.

19. The system of claim 18 wherein the first voltage is based on one or more directional dynamic braking inputs.

20. The system of claim 18, wherein the motor continues normal operation in a direction other than the single direction in which the dynamic braking of the motor is effected.

21. A system for dynamic braking a motor, comprising:

a current regulator having a plurality of input current commands to control a first voltage applied to the motor to provide a torque axis voltage and a second voltage applied to the motor to provide a non-torque axis voltage; and a controller configured to cause the torque axis voltage to be zero, or approximately zero, such that the current provided to the motor is in phase with an internal voltage of the motor in order to achieve dynamic braking of the motor, wherein the controller is further configured to control the first voltage such that the dynamic braking of the motor is effected in both a forward and a reverse direction.

22. The system of claim 21 further comprising a switch for selecting between dynamic braking in a forward direction and dynamic braking in a reverse direction, and wherein the controller is further configured to:

control the first voltage for a first time period such that dynamic braking of the motor is effected in a forward direction when the switch selects dynamic braking in a forward direction;

control the first voltage for a second time period such that the dynamic braking of the motor is effected in a reverse direction when the switch selects dynamic braking in a forward direction.

23. A method of dynamic braking in a motor comprising:

providing a plurality of input current commands to a current regulator to control a first voltage applied to the motor to provide a torque axis voltage and a second voltage applied to the motor to provide a non-torque axis voltage;

causing the torque axis to be zero, or approximately zero, such that current provided to the motor is in phase with an internal voltage of the motor in order to achieve dynamic braking of the motor, wherein at least one of the plurality of input current commands is controlled to drive the torque axis voltage to zero, or approximately zero; and controlling the first voltage to be only positive or only negative such that dynamic braking is effected in only a single direction.

24. The method of claim 23 further comprising providing current feedback from the motor to the current regulator, wherein providing the current feedback further comprises receiving current output from the motor and determining current feedback signals based on the current output and a commutation angle.

25. The method of claim 23, further comprising allowing the motor to continue normal operation in a direction other than the single direction in which the dynamic braking of the motor is effected.

26. A method of dynamic braking in a motor comprising:
providing a plurality of input current commands to a current regulator to control a first voltage applied to the motor to provide a torque axis voltage and a second voltage applied to the motor to provide a non-torque axis voltage; and
limiting a current that a dynamic braking loop commands to the current regulator, wherein the at least one of the plurality of input current commands is controlled to drive the torque axis voltage to zero, or approximately zero, such that current provided to the motor is in phase with an internal voltage of the motor in order to achieve dynamic braking of the motor.

27. The method of claim 26 further comprising electronically adding resistance to the dynamic braking loop to increase damping to eliminate any ringing when the motor is dynamically braked.

28. A method of dynamic braking in a motor comprising:
providing a plurality of input current commands to a current regulator to control a first voltage applied to the motor to provide a torque axis voltage and a second voltage applied to the motor to provide a non-torque axis voltage, wherein the at least one of the plurality of input current commands is controlled to drive the torque axis voltage to zero, or approximately zero;
causing the torque axis to be zero, or approximately zero, such that current provided to the motor is in phase with an internal voltage of the motor in order to achieve dynamic braking of the motor; and
controlling the first voltage such that dynamic braking is effected in both a forward direction and a reverse direction.

29. A system for dynamic braking a motor, comprising:
a motor;
a current regulator having a plurality of input current commands to control a first voltage applied to the motor to provide a torque axis voltage and a second voltage applied to the motor to provide a non-torque axis voltage;
a controller configured to control the torque axis voltage to be zero, or approximately zero, such that the current provided to the motor is in phase with an internal voltage of the motor in order to achieve dynamic braking of the motor, wherein the controller is further configured to control at least one of the plurality of input current commands to drive the torque axis voltage to zero, or approximately zero
and wherein a current commanded to the current regulator is limited by a current limiter.

30. A system for dynamic braking a motor, comprising:
a motor;
a motor drive for driving the motor; and
a controller communicatively coupled to the motor drive, the controller configured to control at least one of the plurality of input current commands to a current regulator having a plurality of input current commands to control a first voltage applied to the motor to provide a torque axis voltage and a second voltage applied to the motor to provide a non-torque axis voltage, wherein the controller is further configured to control the at least one of the plurality of input current commands such that the current provided to the motor is in phase with an internal voltage of the motor in order to achieve dynamic braking of the motor, and wherein a current commanded to the current regulator is limited by a current limiter.

31. An apparatus for dynamic braking a motor, comprising:
a controller configured to control at least one of the plurality of input current commands to a current regulator having a plurality of input current commands to control a first voltage applied to the motor to provide a torque axis voltage and a second voltage applied to the motor to provide a non-torque axis voltage, wherein the controller is further configured to control the at least one of the plurality of input current commands such that the current provided to the motor is in phase with an internal voltage of the motor in order to achieve dynamic braking of the motor, and wherein a current commanded to the current regulator is limited by a current limiter.

32. A system for dynamic braking a motor, comprising:
a current regulator having a plurality of input current commands to control a first voltage applied to the motor to provide a torque axis voltage and a second voltage applied to the motor to provide a non-torque axis voltage; and
a dynamic braking loop associated with the current regulator, wherein the dynamic braking loop uses the torque axis voltage as an input and controls at least one of the plurality of input current commands such that the torque axis voltage is driven to zero, or approximately zero, such that the current provided to the motor is in phase with an internal voltage of the motor in order to achieve dynamic braking of the motor.

33. The system of claim 32, wherein the dynamic braking loop is implemented such that a gain of the dynamic braking loop is fixed and does not vary with a gain of the current regulator.

34. The system of claim 32 further comprising a current limiter for limiting a current that the dynamic braking loop commands to the current regulator.

* * * * *